United States Patent
Bandic et al.

(10) Patent No.: US 10,423,339 B2
(45) Date of Patent: Sep. 24, 2019

(54) LOGICAL BLOCK ADDRESS MAPPING FOR HARD DISK DRIVES

(71) Applicant: HGST Netherlands B.V., Amsterdam (NL)

(72) Inventors: Zvonimir Z. Bandic, San Jose, CA (US); Cyril Guyot, San Jose, CA (US); Adam C. Manzanares, San Jose, CA (US); Noah Watkins, Santa Cruz, CA (US)

(73) Assignee: Western Digital Technologies, Inc., San Jose, CA (US)

(*) Notice: Subject to any disclaimer, the term of this patent is extended or adjusted under 35 U.S.C. 154(b) by 222 days.

(21) Appl. No.: 14/876,151

(22) Filed: Oct. 6, 2015

(65) Prior Publication Data
US 2016/0224260 A1    Aug. 4, 2016

Related U.S. Application Data

(60) Provisional application No. 62/110,892, filed on Feb. 2, 2015.

(51) Int. Cl.
*G06F 12/00* (2006.01)
*G06F 3/06* (2006.01)
*G06F 12/1009* (2016.01)
*G11B 20/12* (2006.01)

(52) U.S. Cl.
CPC .......... *G06F 3/0619* (2013.01); *G06F 3/0644* (2013.01); *G06F 3/0676* (2013.01); *G06F 12/1009* (2013.01); *G11B 20/1217* (2013.01); *G06F 2212/1032* (2013.01); *G11B 2020/1238* (2013.01)

(58) Field of Classification Search
CPC .... G06F 3/0619; G06F 3/0644; G06F 3/0676; G06F 12/1009; G06F 2212/1032; G11B 20/1217
See application file for complete search history.

(56) References Cited

U.S. PATENT DOCUMENTS

| | | | |
|---|---|---|---|
| 8,699,159 B1 | 4/2014 | Malina | |
| 8,699,162 B1 | 4/2014 | Grobis et al. | |
| 8,786,969 B2 | 7/2014 | Kasiraj et al. | |
| 2004/0205092 A1* | 10/2004 | Longo | G06F 3/0613 |

(Continued)

FOREIGN PATENT DOCUMENTS

| | | |
|---|---|---|
| JP | H05217298 A | 8/1993 |
| TW | 201109921 A | 3/2011 |
| WO | WO-2009/126581 | 10/2009 |

OTHER PUBLICATIONS

Search and Examination Report from counterpart GB Patent Application No. GB1601561.2, dated Jul. 1, 2016, 6 pgs.

(Continued)

*Primary Examiner* — Matthew Bradley (57) ABSTRACT

A method may include writing data to a hard drive. In some examples, the method may include receiving, by an extent allocator module, a command to write data. The command may include data and a logical block address (LBA) specified by the host. The method may also include mapping, by the extent allocator module, the LBA specified by the host to a drive LBA. The method may further include sending, from the extent allocator module, a command to write the data at the drive LBA.

20 Claims, 5 Drawing Sheets

(56) References Cited

U.S. PATENT DOCUMENTS

| | | |
|---|---|---|
| 2009/0172246 A1 | 7/2009 | Afriat |
| 2012/0303930 A1* | 11/2012 | Coker .................. G11B 5/012 |
| | | 711/207 |
| 2013/0297894 A1* | 11/2013 | Cohen .................. G06F 3/0679 |
| | | 711/154 |
| 2014/0019680 A1 | 1/2014 | Jin et al. |
| 2014/0036381 A1 | 2/2014 | Brockie et al. |
| 2014/0098438 A1 | 4/2014 | Poudyal |
| 2014/0177085 A1 | 6/2014 | Haga et al. |
| 2014/0201424 A1 | 7/2014 | Chen et al. |
| 2014/0254042 A1 | 9/2014 | Yeo et al. |

OTHER PUBLICATIONS

Shingled magnetic recording disks, Retrieved from http://silvertonconsulting.com/blog/2012/10/04/shingled-magnetic-recording-disks/#sthash.fXF4GmRX.dpbs, Dec. 1, 2014 (1 pg.).

Shingled Magnetic Recording Part 2: Using Shingled Drives, Retrieved from http://www.networkcomputing.com/storage/shingled-magnetic-recording-part-2-using-shingled-drives/a/d-id/1234625, Dec. 1, 2014 (2 pgs.).

Examination Report issued on GB Application GB1601561.2, dated May 4, 2018.

Office Action issued on Chinese Application 201610074218.0, dated Apr. 4, 2018.

\* cited by examiner

FIG. 5 ions comprise a small amount of text...

LOGICAL BLOCK ADDRESS MAPPING FOR HARD DISK DRIVES

The application claims the benefit of U.S. Provisional Application No. 62/110,892, filed Feb. 2, 2015, the entire contents of which is incorporated by reference herein.

TECHNICAL FIELD

The disclosure relates to shingled magnetic recording hard disk drives.

BACKGROUND

Shingled magnetic recording (SMR) regions of a hard disk drive (HDD) restrict the ability to write data into its current location. This restriction is due to the size of SMR regions and a magnetic head that reads and writes the data into the tracks of an SMR region. The magnetic head is wider than the target track width it writes to, causing issues with the re-write performance of an SMR zone in an HDD. Re-writing a track within a zone causes the magnetic head to pass over adjacent tracks, which may cause data in the adjacent tracks to be overwritten. Re-writing a prior track may cause the HDD to re-write large portions of a zone in order to re-write a single section or track. As a result, SMR HDDs may have reduced write performance as compared to other types of HDDs.

SUMMARY

In one example, the disclosure is directed to a method that may include receiving, by an extent allocator module executing at a host device, a command to write data. The command may include data and a logical block address (LBA) specified by a host. The method may also include mapping, by the extent allocator module, the LBA specified by the host to a drive LBA. The method may further include sending, from the extent allocator module and to a hard drive, a command to write the data at the drive LBA.

In another example, the disclosure is directed to a method that may include receiving, by an extent allocator module executing at a hard drive, a command to write data. The command may include data and a logical block address (LBA) specified by a host. The method may also include mapping, by the extent allocator module, the LBA specified by the host to a drive physical block address (PBA). The drive PBA may correspond to an address currently associated with a write pointer. The method may further include sending, from the extent allocator module and to a hardware engine of the hard drive, a command to write the data at the drive PBA.

In one example, the disclosure is directed to a device that may include at least one processor and an extent allocator module operable by the at least one processor. The extent allocator module may receive a command to write data. The command may include data and a logical block address (LBA) specified by a host. The extent allocator module may map the LBA specified by the host to a drive LBA. The extent allocator module may also send, to a hard drive, a command to write the data at the drive LBA.

In another example, the disclosure is directed to a device that may include an interface, a hardware engine, and a controller. The controller may include at least one processor and an extent allocator module operable by the at least one processor. The extent allocator module may receive, via the interface, a command to write data. The command may include data and a logical block address (LBA) specified by a host. The extent allocator module may map the LBA specified by the host to a drive physical block address (PBA). The drive PBA corresponds to an address currently associated with a write pointer. The extent allocator module may also send, to the hardware engine, a command to write the data at the drive PBA.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure describes techniques for managing writes in shingled magnetic recording (SMR) hard disk drives (HDDs). For example, an SMR HDD may be configured to sequentially write data into various zones of the SMR HDD such that the SMR HDD treats the zones as if the zones are "append-only" and, typically, does not overwrite existing data tracks when re-writing data to a particular logical block address (LBA). The SMR HDD may maintain a write pointer associated with each zone that corresponds to a location within the zone for the next write, regardless of whether the next write is to a previously used LBA (i.e., previously written to) or a new LBA (i.e., not previously written to). In addition, the host, the SMR HDD, or both may maintain a mapping between the LBAs used by the host when writing data to the SMR HDD and the physical block addresses (PBAs) to which the data is actually written. If data is written to a previously used LBA, the LBA may be updated to map to the next PBA indicated by the write pointer rather than the PBA that was used for the previous write operation. In this way, techniques of this disclosure may increase the write performance of SMR HDDs while hiding, from the operating system (OS), the "append-only" write characteristics of the SMR HDD that provide the increased write performance.

Figure 1:
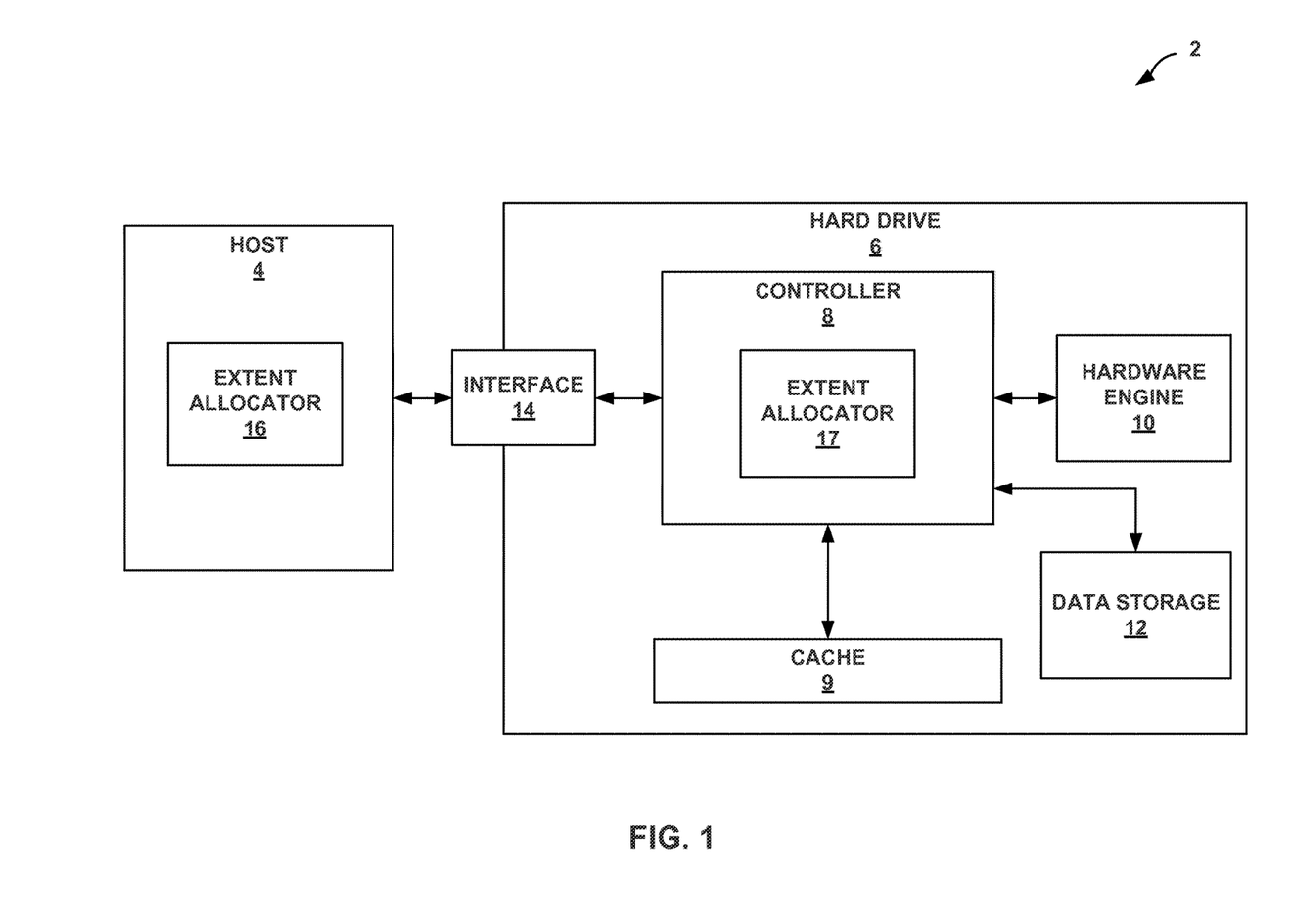
FIG. 1 is a conceptual and schematic block diagram illustrating an example storage environment in which a hard drive may function as a storage device for a host device, in accordance with one or more techniques of this disclosure.

FIG. 1 is a conceptual and schematic block diagram illustrating an example storage environment in which a hard drive may function as a storage device for a host device, in accordance with one or more techniques of this disclosure. For instance, host device 4 may utilize non-volatile memory devices included in hard drive 6 to store and retrieve data. In some examples, storage environment 2 may include a plurality of storage devices, such as hard drive 6, that may operate as a storage array. For instance, storage environment 2 may include a plurality of hard drives 6 configured as a redundant array of inexpensive/independent disks (RAID) that collectively function as a mass storage device for host device 4. While techniques of this disclosure generally refer to storage environment 2 and hard drive 6, techniques described herein may be performed in any storage environment that utilizes tracks of data.

Storage environment 2 may include host device 4 which may store and/or retrieve data to and/or from one or more storage devices, such as hard drive 6. As illustrated in FIG. 1, host device 4 may communicate with hard drive 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like. Typically, host device 4 comprises any device having a processing unit, which may refer to any form of hardware capable of processing data and may include a general purpose processing unit (such as a central processing unit (CPU), dedicated hardware (such as an application specific integrated circuit (ASIC)), configurable hardware such as a field programmable gate array (FPGA) or any other form of processing unit configured by way of software instructions, microcode, firmware or the like. For the purpose of executing techniques of this disclosure, host device 4 may send read and write commands via an extent allocator module 16 and interface 14 to controller 8 for the purpose of reading and re-writing data stored to an SMR region. For ease of illustration only, extent allocator module 16 is described below as included on host 4. However, hard drive 6 may include extent allocator module 17. In some examples, host 4 and hard drive 6 may each include extent allocator modules 16, 17.

As illustrated in FIG. 1 hard drive 6 may include a controller 8, a cache 9, a hardware engine 10, data storage device 12, and an interface 14. In some examples, hard drive 6 may include additional components not shown in FIG. 1 for ease of illustration purposes. For example, hard drive 6 may include power delivery components, including, for example, a capacitor, super capacitor, or battery; a printed circuit board (PCB) to which components of hard drive 6 are mechanically attached and which includes electrically conductive traces that electrically interconnect components of hard drive 6, and the like. In some examples, the physical dimensions and connector configurations of hard drive 6 may conform to one or more standard form factors. Some example standard form factors include, but are not limited to, 3.5" HDD, 2.5" HDD, or 1.8" HDD.

In some examples, cache 9 may store information for processing during operation of hard drive 6. In some examples, cache 9 is a temporary memory, meaning that a primary purpose of cache 9 is not long-term storage. Cache 9 on hard drive 6 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Data storage 12 may be configured to store larger amounts of information than cache 9. Data storage 12 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable memories (EEPROM). Data storage 12 may be one or more magnetic platters in hard drive 6, each platter containing one or more regions of one or more tracks of data.

Hard drive 6 includes controller 8, which may manage one or more operations of hard drive 6. Controller 8 may interface with host device 4 via interface 14 and extent allocator module 16. Controller 8 may manage the storage of data to and the retrieval of data from data storage 12 accessible via hardware engine 10. Controller 8 may, as one example, manage writes to and reads from the memory devices, e.g., a hard disk drive platter. In some examples, controller 8 may be a hardware controller. In other examples, controller 8 may be implemented into hard drive 6 as a software controller.

Host 4 may, in this respect, interface with various hardware engines, such as hardware engine 10, to interact with various sensors. Host 4 may execute software, such as the above noted operating system, to manage interactions between host 4 and hardware engine 10. The operating system may perform arbitration in the context of multi-core CPUs, where each core effectively represents a different CPU, to determine which of the CPUs may access hardware engine 10. The operating system may also perform queue management within the context of a single CPU to address how various events, such as read and write commands in the example of hard drive 6, issued by host 4 should be processed by hardware engine 10 of hard drive 6.

In the example of FIG. 1, hard drive 6 includes hardware engine 10, which may represent the hardware responsible for interfacing with the storage medium. Hardware engine 10 may, in the context of a platter-based hard drive, represent the magnetic read/write head and the accompanying hardware to configure, drive and process the signals sensed by the magnetic read/write head.

Hard drive 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA) and parallel-ATA (PATA)), Fibre Channel, small computer system interface (SCSI), serially attached SCSI (SAS), peripheral component interconnect (PCI), and PCI-express (PCIe). The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit hard drive 6 to receive power from host device 4.

In some examples, hard drive 6 may be an SMR HDD. In SMR, HDD data tracks may partially overlap the previously written data tracks, increasing storage capacity of hard drive 6 by packing the tracks closer together. In some examples, hard drive 6 may be partitioned into zones. Each zone may include several data tracks, and each track may include several sectors. In some examples, hard drive 6 may attempt to write data to a data track that has already been written. Because the write head may be wider than the track, the write head may also overwrite adjacent tracks, which may cause hard drive 6 to re-write large portions of the zone. As a result, write performance of hard drive 6 may suffer.

In order to improve write performance, hard drive 6 may be configured to append any data written to hard disk 6 to the end of the most recently written data, which may make hard drive 6 appear to be "append-only." By appending the data to the end of the previously written data, regardless of whether the data is being re-written to the drive or written to the drive for the first time, techniques of this disclosure may enable improved write performance because hard drive 6 may spend less time re-writing large amounts of data. However, by making each zone operate as "append-only" zones for writing data, hard drive 6 and/or host 4 may not be able to re-write to the same LBA since writing to the same LBA typically causes the data to be written at the same physical block address, which, in SMR HDDs, often results in overwriting other previously written tracks. Host 4 may send a write command to controller 8 via interface 14. In some examples, host 4 may send a block of data and a LBA to controller 8. Controller 8 may interpret the LBA and convert the LBA to a PBA using a mapping function. Controller 8 may cause the data to be written on hard drive 6 at the PBA associated with the LBA sent by host 4. In some examples, host 4 may send a command to controller 8 such that controller 8 causes the write head to write data to an LBA to which data has already been written (e.g., to overwrite the data at the LBA). In some examples, controller 8 may cause hard drive 6 to re-write the data associated with the LBA utilized by host 4. Because, in SMR, the write head is typically wider than the track, controller 8 may command the write head to overwrite neighboring tracks, which overwrites the data stored in the neighboring tracks and may result in data loss. In order to mitigate the data loss, data stored in the neighboring tracks may first be read and then written to another area of the platter such that, after the new data is written, the data that was moved may be read and then written back to the tracks that previously stored the data.

In order to reduce the additional read and write operations typically required in SMR hard drives, techniques of this disclosure may enable host 4 and/or hard drive 6 to manage write commands on tracks of data in data storage 12. For example, hard drive 6 may be configured to write data to the tracks in sequential fashion, such that hard drive 6 may be configured to write to a new PBA rather than reusing the previous PBA associated with the LBA utilized by host 4. However, writing to the next available PBA may cause a mismatch in the mapping scheme between the LBA utilized by host 4 and the PBA written by hard drive 6.

Extent allocator modules 16, 17 may be configured to manage the LBA utilized by host 4 and the LBA utilized by controller 8. Extent allocator module 16 may include a mapping table to map the LBA utilized by host 4 ("host LBA") to the LBA utilized by controller 8 ("drive LBA"), or vice versa. For example, extent allocator module 16 may receive a write command from host 4 and check the mapping table to determine whether the host LBA 4 has been written to on for a prior write. Extent allocator module 16 may determine the drive LBA associated with the write pointer and map the host LBA to the drive LBA. Extent allocator module 16 may issue a write command to write the data at the drive LBA.

Extent allocator module 17 may include a mapping table to map the LBA utilized by host 4 ("host LBA") to the PBA written by hard drive 6 ("drive PBA"). For example, extent allocator module 17 may receive a write command from host 4 and check the mapping table to determine whether hard drive 6 previously wrote to the host LBA. Extent allocator module 17 may determine the drive PBA associated with the write pointer and map the host LBA to the drive PBA. Extent allocator module 17 may issue a write command causing the write head to write data at the drive PBA associated with the host LBA.

Techniques of the present disclosure may improve the performance of hard drive 6 compared to other SMR HDDs by sequentially writing data and treating hard drive 6 as "append-only". By treating hard drive 6 as "append-only," hard drive 6 does not overwrite valid data stored on hard drive 6. Hard drive 6 may avoid having to re-write data that would otherwise be overwritten if hard drive 6 wrote data at the original PBA rather than the PBA mapped by extent allocator modules 16, 17. As a result, hard drive 6 may perform faster writes than conventional SMR HDDs. Further, extent allocator modules 16, 17 may hide the "append-only" nature of hard drive 6 from the OS by managing the mapping between the LBA utilized by host 4 and the drive LBA or the drive PBA. Because extent allocator module 16 may manage the information necessary to write data to, and read data from, hard drive 6, the techniques of this disclosure may enable host 4 to benefit from improved SMR HDD write speeds while using conventional SMR HDDs.

Figure 2:
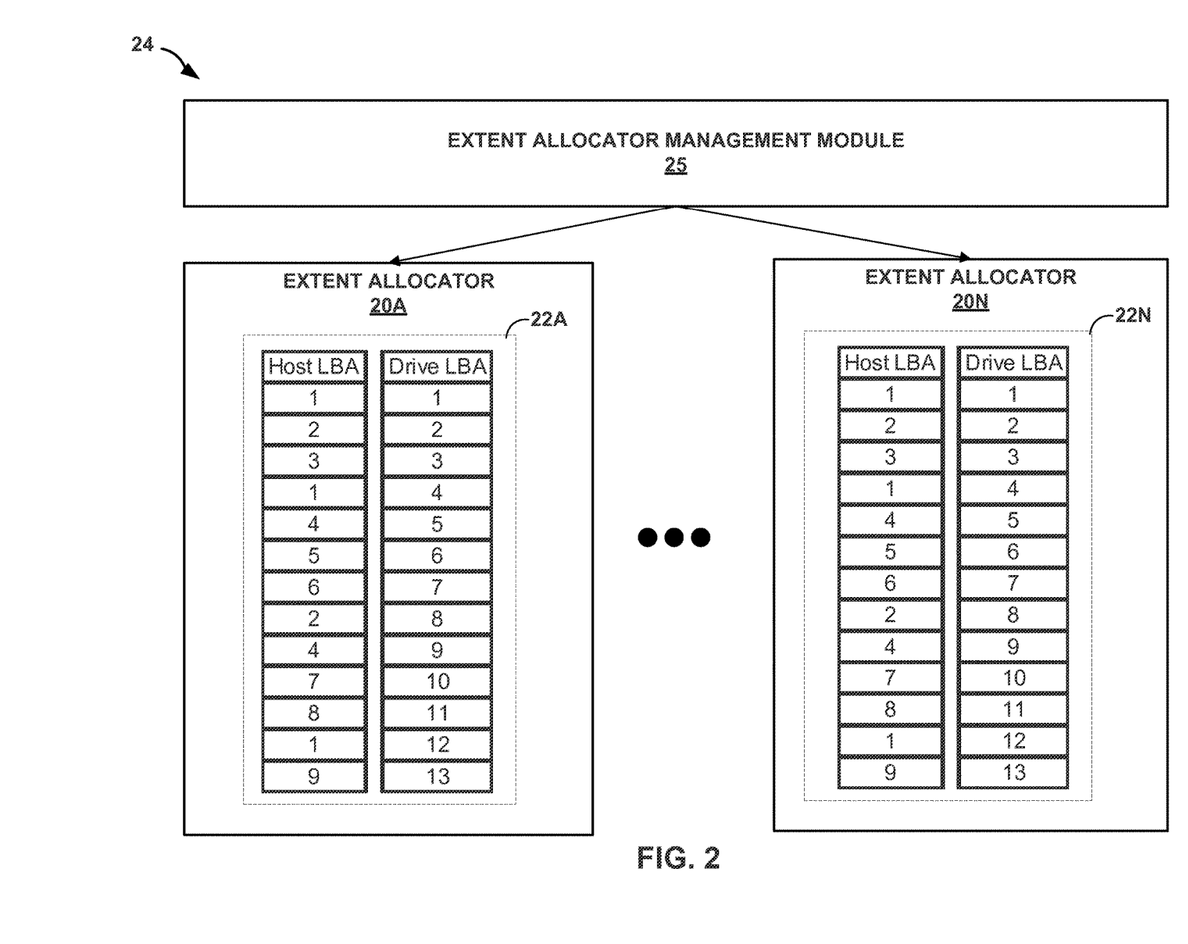
FIG. 2 is a conceptual and schematic block diagram illustrating an example extent allocator system, in accordance with one or more techniques of this disclosure.

FIG. 2 is a conceptual and schematic block diagram illustrating an example extent allocator system, in accordance with one or more techniques of this disclosure. Extent allocator system 24 may include extent allocator management module 25 and extent allocator module s 20A-20N (collectively, "extent allocator module s 20"). Extent allocator management module 25 may be included on host 4 and/or hard drive 6. Likewise, extent allocator modules 20 may be included on host 4 and/or hard drive 6. In some examples, extent allocator system 24 includes one extent allocator module 20. However, in some examples, extent allocator system 24 includes more than one extent allocator module 20. For example, host 4 and/or hard drive 6 may include one extent allocator module 20 for each zone of the hard drive 6.

Extent allocator management module 25 may manage one or more extent allocator modules 20, each of which is associated with at least one respective zone of hard drive 6. For example, if host 4 sends a command to write data at a particular host LBA, extent allocator management module 25 may query a lookup table that designates which host LBA corresponds to which zone in order to determine which zone to write the data to. After determining which zone of hard drive 6 the particular host LBA corresponds to, extent allocator management module 25 may forward the write command from host 4 to the respective extent allocator module 20 for the respective zone.

In some examples, extent allocator management module 25 may manage zones across multiple hard drives 6. For example, extent allocator management module 25 may include a look-up table including each hard drive 6 and each zone for each respective hard drive 6. If host 4 sends a command to write data to a particular host LBA, extent allocator management module 25 may query a lookup table to identify the hard drive 6 and zone that corresponds to the particular host LBA. After identifying the hard drive 6 and zone that corresponds to the particular host LBA, extent allocator management module 25 may forward the write command from host 4 to the respective extent allocator module 20 configured to manage the data for the identified hard drive 6 and zone.

Extent allocator modules 20 of FIG. 2 may correspond with the extent allocator module 16 or extent allocator module 17 of FIG. 1. Each extent allocator module 20A-20N may include a respective mapping table 22A-22N (collectively, "mapping tables 22"). While mapping tables 22 are shown in FIG. 2 as including multiple rows for various host LBAs, in implementation, mapping tables 22 typically includes a single row for each host LBA and updates the drive LBA values as needed rather than adding a new row in mapping table 22. Mapping tables 22 include multiple rows for various host LBAs and drive LBAs for purposes of illustration and to simplify the description of the techniques of this disclosure. Extent allocator modules 20 may facilitate writing and reading of data between host 4 and hard drive 6 by receiving read and write commands from host 4 and issuing read and write commands to hard drive 6. As will be described with reference to FIG. 3, extent allocator modules 20 may also cause metadata to be written to hard drive 6.

For ease of illustration, extent allocator modules 20 will be described with reference to extent allocator module 20A. In some examples, extent allocator module 20A may be included on host 4 (e.g., in examples where extent allocator module 20A corresponds to extent allocator module 16 of FIG. 1). Host 4 may issue a write command to write data at a particular LBA utilized by the host (e.g., block 1), also called a host LBA. Host 4 may send the write command by calling a "PUT" function, the parameters of which may include the data to be written to hard drive 6 and a host LBA. Extent allocator module 20A may receive the write command from host 4. Extent allocator module 20A may determine, based upon data stored in mapping table 22A, whether data had been previously written to the host LBA.

Mapping table 22A may include a plurality of rows and columns. In some examples, mapping table 22A may include columns "host LBA" and "drive LBA". The host LBA may represent the LBA utilized by host 4 while the drive LBA may represent the LBA utilized by controller 8 on hard drive 6. Based on mapping table 22A, extent allocator module 20A may translate a host LBA to a drive LBA. As a result, host 4 may send a write command, extent allocator module 20A may map the host LBA to a drive LBA, and extent allocator module 20A may issue a write command so that hard drive 6 may write the data in sequential fashion. The write command issued by extent allocator module 20A may include the data to be written, the drive LBA specifying where the data is to be written on hard drive 6, and the length of the data to be written.

Controller 8 may receive the write command from extent allocator module 20A, cause the write head to write the data at the next PBA in the zone, and return the drive LBA associated with the PBA. For example, the first time that host 4 sends a write command for writing data at host LBA 1, extent allocator module 20A may receive the write command from host 4 for writing data at host LBA 1 and determine a corresponding drive LBA. Extent allocator module 20A may determine the next available drive LBA by determining the address currently associated with a write pointer for the zone. The address currently associated with the write pointer for a given zone is also referred to as the next write address.

In the illustrated example, the write pointer for the zone points to drive LBA 1. Extent allocator module 20A may update mapping table 22A to record the corresponding host LBA and drive LBA and may send a command to controller 8 to write the data to drive LBA 1. In some examples, extent allocator module 20A may determine that mapping table 22A does not include an entry corresponding to the host LBA and may create a new entry in mapping table 22A to record the corresponding host LBA and drive LBA. For example, extent allocator module 20A may query mapping table 22A to determine whether mapping table 22A includes an entry for host LBA 1. If mapping table 22A does not include an entry corresponding to host LBA 1, extent allocator module 20A may create a new entry in mapping table 22A for host LBA 1 and the corresponding drive LBA. In some examples, extent allocator module 20A may send the write command to controller 8 prior to updating mapping table 22A and, responsive to receiving an indication of the drive LBA at which controller 8 actually wrote the data, update mapping table 22A to map the host LBA to the drive LBA indicated by controller 8. Controller 8 may convert drive LBA 1 to a drive PBA and command the write head to write the data at the corresponding PBA.

Host 4 may send a command to write data at host LBA 2 for the first time. Based on the address currently associated with the zone write pointer, extent allocator module 20A may map host LBA 2 to drive LBA 2. Extent allocator module 20A may issue a write command causing the data to be written at drive LBA 2. After the data is written, the zone write pointer may be updated to point to the next available drive LBA on hard drive 6 (e.g., drive LBA 3). Likewise, extent allocator module 20A may receive a command from host 4 to write data at LBA 3. Extent allocator module 20A may check mapping table 22A, determine that host LBA 3 has not been written, and map host LBA 3 to the drive LBA associated with the zone write pointer (e.g., drive LBA 3). Extent allocator module 20A may send a command to controller 8 such that controller 8 causes the write head to write the data at the associated drive LBA. For each write command that it receives, controller 8 may translate the drive LBA to a PBA and cause hard drive 6 to write the data at the particular PBA. For example, controller 8 may send a command to the hardware engine causing the write head to write the data.

Host 4 may send a command to write data to host LBA 1 a second time. However, because hard drive 6 is configured to append data to the end of the most recently written data, extent allocator module 20A may be configured to re-map the host LBA to a new drive LBA that corresponds to the address currently associated with the write pointer. In the illustrated example, the second time that host 4 sends a write command to write data at host LBA 1, extent allocator module 20A may determine that the write pointer corresponds to drive LBA 4. Thus, extent allocator module 20A may re-map host LBA 1 to drive LBA 4. In some examples, extent allocator module 20A may determine that mapping table 22A already includes an entry corresponding to the host LBA and may update the existing entry in mapping table 22A to map the host LBA to a new drive LBA. For example, extent allocator module 20A may query mapping table 22A to determine whether mapping table 22A includes an entry for host LBA 1. If mapping table 22A includes an entry for host LBA 1, extent allocator module 20A may update the existing mapping of host LBA 1 from drive LBA 1 to drive LBA 4. In some examples, extent allocator module 20A may create a new entry in mapping table 22A for the updated mapping between the host LBA and the drive LBA. For example, extent allocator module 20A may create a new row in mapping table 22A that maps host LBA 1 to drive LBA 4 and delete the prior mapping or mark the prior mapping as invalid.

Extent allocator module 20A may send a command to controller 8 to write the data at updated drive LBA 4. Controller 8 may send a command to the hardware engine, causing hard drive 6 to write the data at the PBA associated with drive LBA 4. By appending the data at the address currently associated with the write pointer, the performance of hard drive 6 may improve over other SMR HDDs because writing the data at the address currently associated with the write pointer does not overwrite other, valid data stored on hard drive 6 as the neighboring tracks do not include valid data, which enables hard drive 6 to avoid having to re-write the data that would have been overwritten had hard drive 6 written the data at the initial PBA rather than the updated PBA. Further, extent allocator module 20A may hide the "append-only" writes of hard drive 6 from the OS by managing the mapping between host LBA and drive LBA.

After attempting to write to host LBA block 1 for the second time, host 4 may send a write command for writing data at host LBA 4. Extent allocator module 20A may check mapping table 22A and determine that host LBA 4 was not previously written to as there is no existing entry in mapping table 22A for host LBA 4. Extent allocator module 20A may perform a lookup to determine a current drive LBA associated with the write pointer, determine, based on the lookup, that the write pointer for the zone corresponds to drive LBA 5 and map the host LBA 4 to the drive LBA 5. Extent allocator module 20A may issue a write command causing controller 8 to write the data at drive LBA 5. After writing the data, extent allocator module 20A may update the value of the write pointer to be the value of the next available drive LBA (e.g., drive LBA 6).

Host 4 may send additional commands to write data to host LBAs to which data has been previously written. For example, after attempting to write host LBAs 1-6, host 4 may send a command to re-write data at host LBA 2. Extent allocator module 20A may check mapping table 22A and determine that host LBA 2 has been written in the past (i.e., because an entry for host LBA 2 exists within mapping table 22A and the entry is not marked as invalid). Rather than writing the data to drive LBA 2, extent allocator module 20A may determine the address currently associated with the write pointer (i.e., the LBA stored by the write pointer) and map host LBA 2 to the address currently associated with the write pointer (e.g., drive LBA 8 as shown mapping table 22A). In this example, extent allocator module 20A may determine that the next available drive LBA is drive LBA 8, and may update the mapping table 22A to show that host LBA 2 is written to the hard drive 6 at drive LBA 8.

Extent allocator module 20A may continue to receive write commands from host 4 and determine whether the host LBA for each command will be written for the first time or whether the host LBA has been used in the past. Extent allocator module 20A may determine the drive LBA associated with the write pointer and map the host LBA to the drive LBA associated with the write pointer. Extent allocator module 20A may issue a write command and pass the data and updated drive LBA to controller 8 so that the data may be written to hard drive 6 at the determined drive LBA.

In some examples, extent allocator module 20A manages the write pointer for the respective zone 30. In some examples, extent allocator module 20A may determine the value of the write pointer by querying mapping table 22A to determine the largest host LBA recorded in mapping table 22A, and set the write pointer to the next available (i.e., the next unused) drive LBA. For example, extent allocator module 20A may query mapping table 22A, determine that the last drive LBA recorded in mapping table 22A is drive LBA 13, and set the write pointer to the next unused drive LBA (i.e., drive LBA 14). In some examples, the write pointer includes an integer stored in memory that is managed by host 4 or hard drive 6. For example, after extent allocator module 20A maps a host LBA to a particular drive LBA and hard drive 6 writes the data to the particular drive LBA, extent allocator module 20A may update the integer stored in memory to be a number that corresponds to the next unused drive LBA on hard drive 6.

Host 4 may send a read command to read data stored at a given host LBA. Extent allocator module 20A may receive the command and may determine the current drive LBA associated with the host LBA based on mapping table 22A. Extent allocator module 20A may send a read command with the most recent drive LBA to controller 8. Controller 8 may receive the read command from extent allocator module 20A and cause the data associated with the drive LBA to be read.

In some examples, extent allocator module 20A may be included within hard drive 6 rather than host 4, such as in the example of controller 8, which includes extent allocator module 17, as shown in FIG. 1. In this example, extent allocator module 20A may receive a host LBA from host 4 and map the host LBA to a drive PBA. In this example, mapping table 22 would include the columns "host LBA" and "drive PBA." For example, extent allocator module 20A may query mapping table 22A to determine whether mapping table 22A includes an entry to a particular host LBA. If host 4 sends a command to write data to a particular host LBA that has already been written, extent allocator module 20A may re-map the host LBA to a new PBA corresponding to the address currently associated with the zone write pointer for the particular zone in which the data is being written. Extent allocator module 20A may re-map the host LBA to a new PBA by updating an existing entry in mapping table 22A, or by creating a new entry in mapping table 22A and marking the existing mapping as stale or invalid. Extent allocator module 20A may send a write command that includes the new PBA, such that controller 8 causes the data to be written to hard drive 6 at the new PBA. Likewise, host 4 may send a read command, including a host LBA, to extent allocator module 20A. Extent allocator module 20A may determine the PBA associated with the particular LBA specified by host 4, and issue a read command causing the data to be read from the PBA. Extent allocator module 20A on hard drive 6 may also maintain the write pointer for the respective zone on hard drive 6. For example, extent allocator module 20A may determine the write pointer by querying mapping table 22A, determining the largest drive PBA recorded in mapping table 22A, and setting the write pointer to the next written PBA. In some examples, extent allocator module 20A may maintain the write pointer by storing an integer in memory that corresponds to the next unused PBA on hard drive 6.

Figure 3:
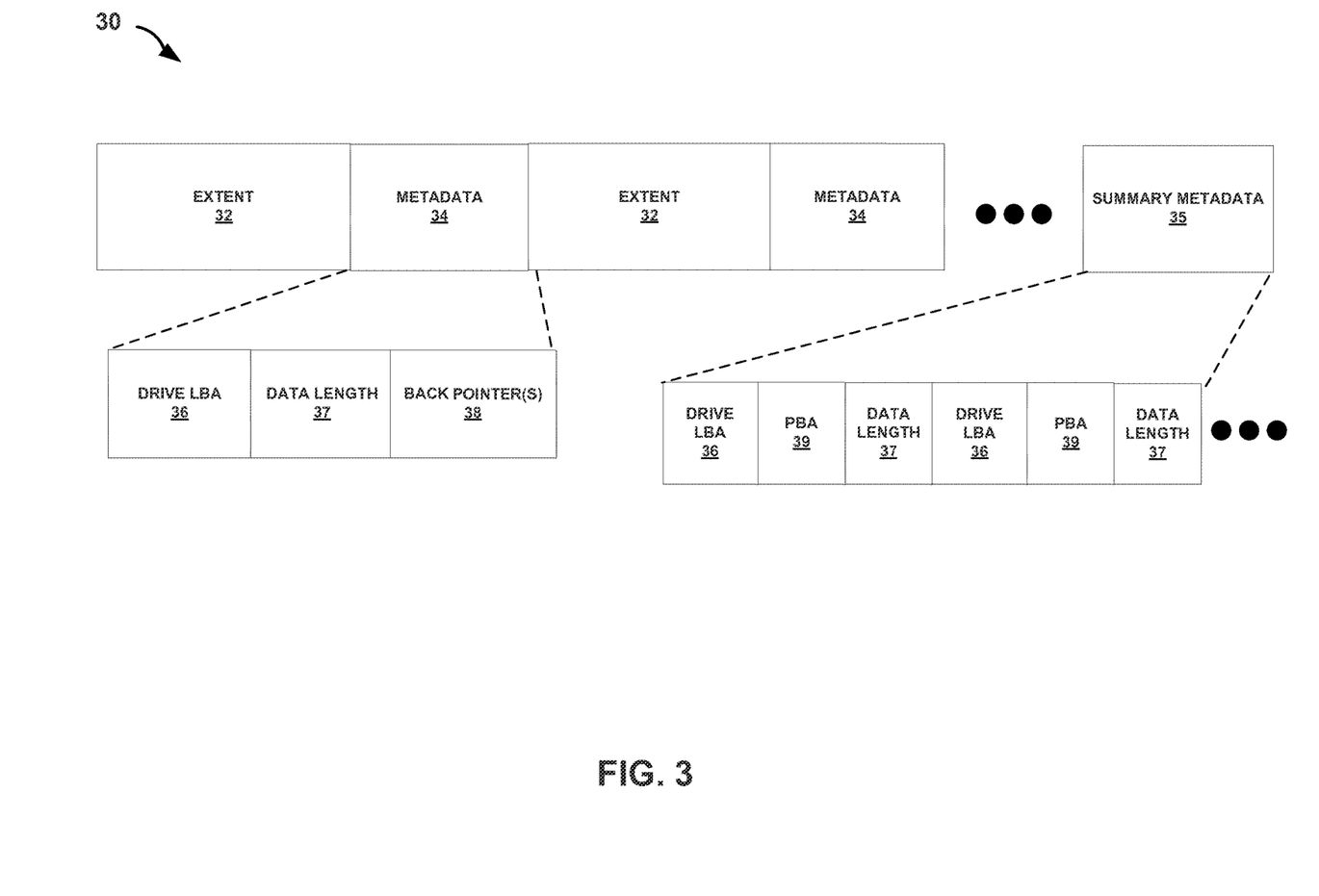
FIG. 3 is a conceptual and schematic block diagram illustrating an example zone of an SMR HDD, in accordance with one or more techniques of this disclosure.

FIG. 3 is a conceptual and schematic block diagram illustrating an example zone of an SMR HDD, in accordance with one or more techniques of this disclosure. While only a single zone is shown in FIG. 3, hard disk 6 may include any number of zones 30. In some examples, there may be one extent allocator module 20 per zone 30 of hard drive 6. Each zone 30 is associated with a respective write pointer corresponding to a location within zone 30 for the next write. In some examples, host 4 or hard drive 6 may include an extent allocator management module 25 that determines which extent allocator module 20 will receive the write command from host 4. The extent allocator management module 25 may include a lookup table that includes each hard drive 6, extent allocator module 20, and a range of host LBAs associated with each hard drive 6 and extent allocator module 20. Extent allocator management module 25 may receive a write command from host 4, determine which extent allocator module 20 should receive the write command, and forward the write command to the respective extent allocator module 20. When a particular extent allocator module 20 receives a command from host 4 to write data at a host LBA in its respective zone 30, extent allocator module 20 may translate the host LBA received from host 4 to a drive LBA using mapping table 22, as described with reference to FIG. 2.

In some examples, zone 30 includes a plurality of extents 32, a plurality of metadata 34, and summary metadata 35. Each extent 32 includes data from host 4 corresponding to a respective write command. Each section of metadata 34 provides information about the respective extent 32. In some examples, metadata 34 includes the drive LBA 36 of the associated extent 32 (e.g., the LBA mapped by extent allocator module 20), the length or size of the extent 37 (e.g., the number of bits), and one or more back pointers 38. The one or more back pointers 38 may specify a location of a set of metadata 34 associated with different data. In some examples, metadata 34 may include a checksum of the data contained within the extent 32. Metadata 34 may include more or fewer categories of information. Metadata 34 may be a fixed size. However, metadata 34 may be variable in size.

Summary metadata 35 may include a set of metadata stored within a particular portion of hard drive 6 designated to store multiple sets of metadata 34. Summary metadata 35 may include information for each extent 32 in zone 30, such as respective drive LBA 36, PBA 39, and data length 37. Data length 37 specifies the size of the data (e.g., the number of bytes of the data, the number of blocks used to store the data, etc.).

In operation, extent allocator module 20 may issue write command, including data and a drive LBA, to controller 8, such that controller 8 causes the data to be written to an extent 32 in zone 30. Extent allocator module 20 may also command controller 8 to write metadata 34 to the respective zone. Controller 8 may cause the write head to write metadata 34 after every extent 32 so that every extent 32 has a corresponding section of metadata 34. In some examples, extent allocator module 20 causes metadata 34 to be appended to zone 30 such that metadata 34 may be located immediately after its respective extent 32.

Metadata 34 may allow hard drive 6 and/or host 4 to determine where extents 32 are written on hard drive 6. As illustrated in FIG. 3, in some examples, each metadata 34 is a fixed size and the metadata includes the drive LBA 36 and size 37 of extent 32. As a result, host 4 and/or hard drive 6 may calculate the starting location of the extent 32 and the location of the prior metadata 34. In some examples, the one or more back pointers 38 may speed up the discovery of earlier metadata 34. The one or more back pointers 38 may point to previously written metadata 34 or extents 32, which may allow host 4 or controller 8 to determine where a previous section (or sections) of metadata 34 is located without calculating the locations. As a result, host 4 or controller 8 may determine where prior extents 32 are located more efficiently.

Controller 8 may write summary metadata 35 after a predetermined number of extents 32. In some examples, controller 8 may write summary metadata 35 in a portion of hard drive 6 designated to store multiple sets of metadata 35, such as at the end of the respective zone 30. Summary metadata 35 may enable host 4 or hard drive 6 to determine the drive LBA, PBA, and size, for every extent 32 on the zone 30 without reading the entire zone 30.

In some examples, mapping table 22 may need to be rebuilt and extent allocator module 20 may determine which drive LBA corresponds to a given host LBA based on the metadata. As the metadata is typically written sequentially, the metadata that currently corresponds to a particular host LBA may be the most recently written metadata for the data stored at the particular host LBA. Extent allocator module 20 may determine which drive LBA corresponds to the particular host LBA by at least determining which drive LBA is included in the most recently written metadata for the data written at the particular host LBA. For example, if extent allocator module 20 mapped host LBA 1 to drive LBA 1, and later re-mapped host LBA 1 to drive LBA 4, extent allocator module 20 may determine which set of metadata associated with host LBA 1 is the current metadata associated with host LBA 1 by determining which set of metadata was written most recently, querying the current metadata corresponding to host LBA 1, and determine that the metadata includes drive LBA 4.

Extent allocator module 20 may assist in garbage collection of hard drive 6. For example, re-writing data for a particular host LBA may cause data on hard drive 6 to become stale or invalid. Further, mapping table 22 may include entries that are stale or invalid. For example, if a particular host LBA is written more than one time, only the most recent mapping between the host LBA and the drive LBA (or drive PBA) is valid. Host 4 and/or controller 8 may perform garbage collection by re-mapping at least a portion of the host LBAs in mapping table 22 to a contiguous section of drive LBAs (or drive PBAs), and causing the write head of hard drive 6 to re-write the respective data in a contiguous block within zone 30.

Figure 4:
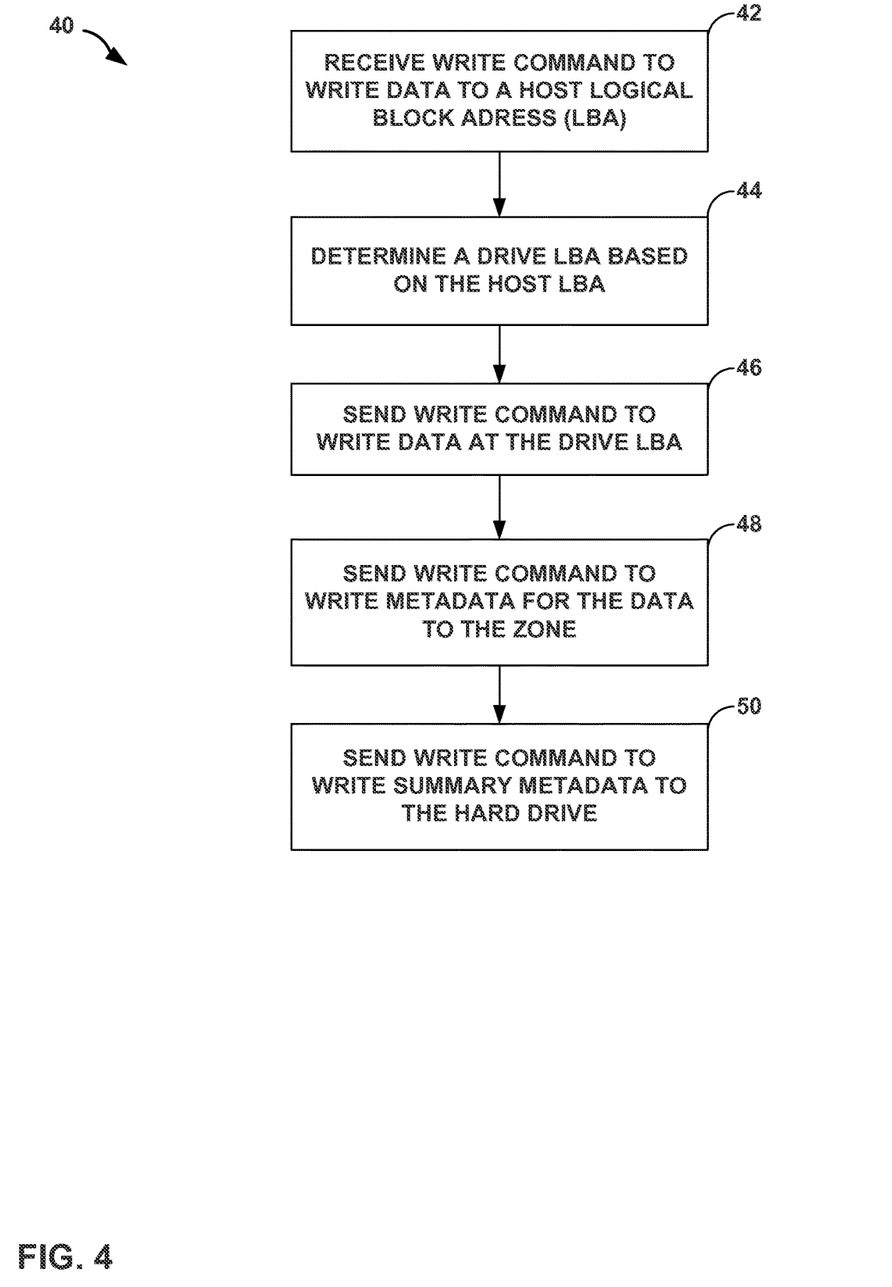
FIG. 4 is a flow diagram illustrating an example technique for storing data to an SMR HDD, in accordance with one or more techniques of this disclosure.

FIG. 4 is a flow diagram illustrating an example technique for storing data to an SMR HDD, in accordance with one or more techniques of this disclosure. For purposes of illustration, the exemplary technique illustrated in FIG. 4 will be described with respect to hard drive 6 of FIG. 1, extent allocator module 20 of FIG. 2, and zone 30 of FIG. 3, but the techniques may be used with any combination of hardware or software.

In some examples, extent allocator module 20 may receive a write command from host 4 (42). The write command may include a block of data and a host LBA. In some examples, host 4 may send a write command for a host LBA that has already been written. Extent allocator module 20 may check mapping table 22 to determine whether the host LBA has been written already.

Extent allocator module 20 may map the host LBA received from host 4 to a drive LBA (44). For example, extent allocator module 20 may query mapping table 22 and determine whether mapping table 22 includes an entry to the particular host LBA specified by host 4. If mapping table 22 includes an entry for the particular host LBA specified by host 4, extent allocator module 20 may update the mapping between the host LBA and drive LBA to the address currently associated with the write pointer. If mapping table 22 does not include an entry for the particular host LBA specified by host 4, extent allocator module 20 may create an entry in mapping table 22 that maps the host LBA specified by host 4 to the address currently associated with the write pointer. In some examples, extent allocator module 20 may determine which drive LBA will be mapped to the host LBA based on the write pointer for the respective zone of the hard drive 6.

Extent allocator module 20 may determine the address currently associated with the write pointer by querying mapping table 22 to determine the next unused drive LBA (i.e., the smallest drive LBA that has not already been written). In some examples, the write pointer may include an integer stored in memory and extent allocator module 20 may increase the integer after every write so that the integer corresponds to the next unused drive LBA. In some examples, the write pointer corresponds to the next unused drive PBA (i.e., the smallest drive PBA that has not already been written).

In some examples, extent allocator module 20 may map the host LBA received from host 4 to a drive PBA. For example, extent allocator module 20 may query mapping table 22 and determine whether mapping table 22 includes an entry for the particular host LBA specified by host 4. If mapping table 22 includes an entry for the particular host LBA specified by host 4, extent allocator module 20 may re-map the particular host LBA to the address currently associated with the write pointer. If mapping table 22 does not include an entry for the particular host LBA specified by host 4, extent allocator module 20 may create an entry mapping the particular host LBA specified by host 4 to the PBA indicated by the write pointer.

Extent allocator module 20 may send, to hard drive 6, a write command that includes the data specified by host 4 and the drive LBA mapped to the host LBA specified by host 4 (46). The write command may cause hard drive 6 to write the data to the drive LBA determined by extent allocator module 20. In instances where hard drive 6 includes extent allocator module 20, controller 8 may receive a write command from host 4. Extent allocator module 20 may map a host LBA to a corresponding drive LBA or drive PBA, may maintain a write pointer indicating the next unused block address, and may map the host LBA to the address currently associated with the write pointer. Because the write pointer points to the next unused block, extent allocator module 20 maps the host LBA to a corresponding drive LBA or drive PBA in sequential fashion. Thus, hard drive 6 may write the data sequentially, which may reduce the amount of data that must be re-written and improve the write performance of hard drive 6.

Extent allocator module 20 may send a command to controller 8 to write metadata 34 to the hard drive 6 (48). In some examples, controller 8 may cause the write head to write metadata 34 to hard drive 6 after every extent 32 in a location that immediately follows the data. Metadata 34 may include the drive LBA corresponding to the data, the data length, and one or more back pointers to at least one prior section of metadata 34 as well as a checksum of the data written to extent 32. Metadata 34 may enable hard drive 6 and/or host 4 to determine where extents 32 are written on hard drive 6. In some examples, host 4 and/or hard drive 6 may determine the starting location of extent 32 and the location of prior metadata 34 based on the size of metadata 34, drive LBA 36, and the size 37 of extent 32.

Extent allocator module 20 may send a command to controller 8 to write summary metadata to hard drive 6 (50). In some examples, the summary metadata may include the drive LBA, PBA, and data length for each extent of data. In some examples, extent allocator module 20 may cause summary metadata to be written at the end of zone 30. Summary metadata may enable host 4 and/or hard drive 6 to determine the drive LBA, PBA, and size, for every extent 32 on zone 30 without reading the entire zone 30.

Figure 5:
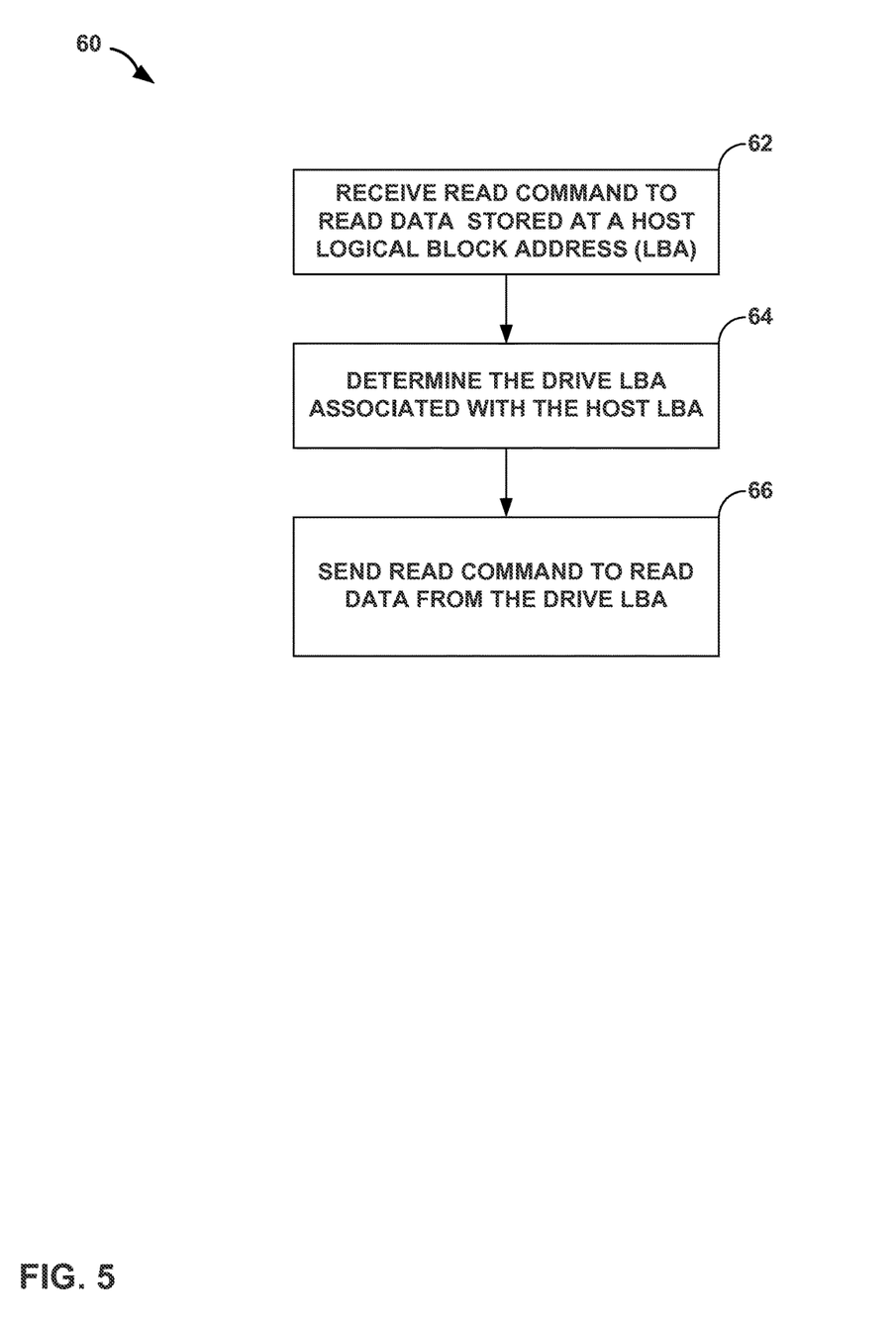
FIG. 5 is a flow diagram illustrating an example technique for reading data from an SMR HDD, in accordance with one or more techniques of this disclosure.

FIG. 5 is a flow diagram illustrating an example method for reading data from an SMR HDD, in accordance with one or more techniques of this disclosure. For purposes of illustration, the exemplary technique illustrated in FIG. 5 will be described with respect to hard drive 6 of FIG. 1, extent allocator module 20 of FIG. 2, and zone 30 of FIG. 3, but the techniques may be used with any combination of hardware or software.

In some examples, host 4 may send a read command to read data from a particular host LBA. Extent allocator module 20 may receive the read command from host 4 (62). The read command may include the host LBA specifying which block of data that host 4 would like to receive.

Extent allocator module 20 may determine the drive LBA associated with the LBA specified by host 4 (64). For example, extent allocator module 20 may query mapping table 22 to determine which drive LBA was previously mapped to the host LBA. In some examples, mapping table 22 may include multiple entries for the LBA specified by host 4. Extent allocator module 20 may determine which entry includes the current mapping by determining whether an entry has been marked invalid or stale, or by determining which entry maps the host LBA to the largest drive LBA. In some examples, extent allocator module 20 may determine the drive PBA associated with the LBA specified by host 4. For example, extent allocator module 20 may query mapping table 22 to determine which drive PBA was previously mapped to the host LBA. If mapping table 22 includes multiple entries for the host LBA, extent allocator module 20 may determine which entry includes the current mapping by determining whether an entry has been marked stale or invalid, or by determining which entry maps the host LBA to the largest drive PBA.

Extent allocator module 20 may send a read command to hard drive 6 for reading data at the drive LBA associated with the host LBA (66). In some examples, the read command may include the drive LBA. In some examples, the read command may include the drive PBA. Hard drive 6 may receive the command to read data from the particular drive LBA or drive PBA and return that data to host 4.

The techniques described in this disclosure may be implemented, at least in part, in hardware, software, firmware, or any combination thereof. For example, various aspects of the described techniques may be implemented within one or more processing units, including one or more microprocessing units, digital signal processing units (DSPs), application specific integrated circuits (ASICs), field programmable gate arrays (FPGAs), or any other equivalent integrated or discrete logic circuitry, as well as any combinations of such components. The term "processing unit" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processing units, or other processing units, to implement one or more of the techniques described herein, such as when instructions included or encoded in the computer-readable storage medium are executed by the one or more processing units. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A method comprising:
  receiving, by an extent allocator module executing within a host device, a first command to write data, wherein the first command includes data and a logical block address (LBA) specified by a host;
  determining, based on a write pointer, a next write address;
  determining, by the extent allocator module, whether a mapping table includes the LBA specified by the host and a corresponding drive LBA;
  the extent allocator module:
    responsive to determining that the mapping table includes the LBA specified by the host, updating an existing mapping in the mapping table to map the LBA specified by the host to the next write address associated with the write pointer, or
    responsive to determining that the mapping table does not include the LBA specified by the host, creating a new mapping in the mapping table to map the LBA specified by the host to the next write address associated with the write pointer; and
  sending, from the extent allocator module and to a hard drive, a second command to write the data at a drive LBA corresponding to the next write address such that valid data is not overwritten.

2. The method of claim 1, further comprising:
  determining, by the extent allocator module, whether the LBA specified by the host has been previously written; and
  responsive to determining that the LBA specified by the host has been previously written, updating, by the extent allocator module, an existing mapping in the mapping table such that the LBA specified by the host corresponds to an updated drive LBA.

3. The method of claim 2, wherein the updated drive LBA comprises an address currently associated with a write pointer.

4. The method of claim 1, further comprising:
  determining, by the extent allocator module, whether the LBA specified by the host has been previously written; and
  responsive to determining that the LBA specified by the host has not been previously written, creating, by the extent allocator module, a new mapping in the mapping table such that the LBA specified by the host corresponds to the drive LBA.

5. The method of claim 1, further comprising:
  updating, by the extent allocator module, the mapping table to include the LBA specified by the host and the drive LBA corresponding to the next write address.

6. The method of claim 1, further comprising:
  sending, by the extent allocator module and to a controller, a third command to write a set of metadata associated with the data, wherein the set of metadata includes the drive LBA associated with the LBA specified by the host, a length of the data, and a group of at least one back pointer, wherein each back pointer of the group of at least one back pointer specifies a respective location of a set of metadata associated with different data.

7. The method of claim 1, further comprising:
  receiving, by an extent allocator management module, the first command to write data;
  identifying, by the extent allocator management module, based on the LBA specified by the host, one extent allocator module from a plurality of extent allocator modules, wherein each extent allocator module from the plurality of extent allocator modules manages data stored at a respective zone of a plurality of zones of the hard drive; and
  sending, from the extent allocator management module and to the one extent allocator module, the first command to write data.

8. The method of claim 1, further comprising:
  sending, by the extent allocator module and to a controller, a third command to write a set of metadata associated with the data, wherein the set of metadata includes the drive LBA associated with the LBA specified by the host and a length of the data, wherein the set of metadata is stored within a particular portion of the hard drive designated to store multiple sets of metadata, and wherein the multiple sets of metadata are sequentially stored within the particular portion of the hard drive.

9. The method of claim 1, further comprising:
  sending, by the extent allocator module and to a controller, a third command to read a set of metadata associated with the data, wherein the set of metadata includes the drive LBA associated with the LBA specified by the host;
  determining, by the extent allocator module, which set of metadata associated with the data is the current set of metadata for the respective data; and
  updating, by the extent allocator module, a mapping of the LBA specified by the host and the drive LBA based on determining which set of metadata is the current set of metadata for the respective data.

10. A method comprising:
  receiving, by an extent allocator module executing within a hard drive, a first command to write data, wherein the first command includes data and a logical block address (LBA) specified by a host;
  determining, based on a write pointer, a next write address;
  determining, by the extent allocator module, whether a mapping table includes the LBA specified by the host and a corresponding drive physical block address (PBA);

the extent allocator module:
  responsive to determining that the LBA specified by the host has been previously written, updating an existing mapping in the mapping table to include the LBA specified by the host and the corresponding drive PBA, wherein the corresponding drive PBA is associated with the next write address, or
  responsive to determining that the LBA specified by the host has not been previously written, creating a new mapping in the mapping table to map the LBA specified by the host to the corresponding drive PBA, wherein the corresponding drive PBA is associated with the next write address; and
sending, from the extent allocator module and to the hard drive, a second command to write the data at the drive PBA associated with the next write address, thereby avoiding overwriting valid data stored on the hard drive.

11. The method of claim 10, further comprising:
determining, by the extent allocator module, whether the LBA specified by the host has been previously written; and
responsive to determining that the LBA specified by the host has been previously written, updating, by the extent allocator module, an existing mapping such that the LBA specified by the host corresponds to an updated drive PBA.

12. The method of claim 11, wherein the updated drive PBA comprises an address currently associated with a write pointer.

13. The method of claim 10, further comprising:
sending, by the extent allocator module and to a controller, a third command to write a set of metadata associated with the data, wherein the set of metadata includes the drive PBA associated with the LBA specified by the host, a length of the data, and a group of at least one back pointer, wherein each back pointer of the group of at least one back pointer specifies a respective location of a set of metadata associated with different data.

14. The method of claim 10, further comprising:
receiving, by an extent allocator management module, the first command to write data;
identifying, by the extent allocator management module, based on the LBA specified by the host, one extent allocator module from a plurality of extent allocator modules, wherein each extent allocator module from the plurality of extent allocator modules manages data stored at a respective zone of a plurality of zone of the hard drive; and
sending, from the extent allocator management module and to the one extent allocator module, the first command to write data.

15. The method of claim 10, further comprising:
sending, by the extent allocator module and to a controller, a third command to write a set of metadata associated with the data, wherein the set of metadata includes the drive PBA associated with the LBA specified by the host and a length of the data, wherein the set of metadata is stored within a particular portion of the hard drive designated to store multiple sets of metadata, and wherein the multiple sets of metadata are sequentially stored within the particular portion of the hard drive.

16. The method of claim 10, further comprising:
sending, by the extent allocator module and to a controller, a third command to read a set of metadata associated with the data, wherein the set of metadata includes the drive PBA associated with the LBA specified by the host;
determining, by the extent allocator module, which set of metadata associated with the data is the current set of metadata for the respective data; and
updating, by the extent allocator module, the mapping of the LBA specified by the host and the corresponding drive PBA based on determining which set of metadata is the current set of metadata for the respective data.

17. A device comprising:
at least one processor; and
an extent allocator module operable by the at least one processor and configured to:
  receive a first command to write data, wherein the first command includes data and a logical block address (LBA) specified by a host;
  determine, based on a write pointer, a next write address;
  determine whether a mapping table includes the LBA specified by the host and a drive LBA associated with the LBA specified by the host;
  responsive to determining that the LBA specified by the host has been previously written, update the mapping table to include the LBA specified by the host and the drive LBA, wherein the drive LBA is associated with the next write address; and
  send, to a hard drive, a second command to write the data at the drive LBA.

18. The device of claim 17, wherein the hard drive is a shingled magnetic recording (SMR) hard drive.

19. A device comprising:
means for receiving a first command to write data, wherein the first command includes data and a logical block address (LBA) specified by a host;
means for determining, based on a write pointer, a next write address;
means for determining whether a mapping table includes the LBA specified by the host and a corresponding drive PBA associated with the LBA specified by the host; and
means for updating the mapping table, responsive to determining that the LBA specified by the host has been previously written, to include the LBA specified by the host and the corresponding drive PBA, wherein the corresponding drive PBA is associated with the next write address; and
means for sending a second command to write the data at the corresponding drive PBA.

20. The device of claim 19, wherein the device is a shingled magnetic recording (SMR) device.

* * * * *